July 15, 1930.  M. W. MORGAN  1,770,744
FLEXIBLE MARINE TYPE COUPLING
Filed Nov. 30, 1927

INVENTOR.
M. W. Morgan,
BY
his ATTORNEYS

Patented July 15, 1930

1,770,744

UNITED STATES PATENT OFFICE

MERTON W. MORGAN, OF BALTIMORE, MARYLAND, ASSIGNOR TO POOLE ENGINEERING AND MACHINE COMPANY, OF BALTIMORE, MARYLAND, A CORPORATION OF MARYLAND

FLEXIBLE MARINE-TYPE COUPLING

Application filed November 30, 1927. Serial No. 236,800.

This invention relates to improvements in flexible shaft couplings of the type disclosed in applicant's application Serial No. 108,121.

In flexible couplings of this type the end of each of the two shafts is provided with a hub having teeth which are adapted to intermesh with teeth on the sleeve whereby rotary motion is transmitted from one to the other of the shafts. This sleeve has a rocking bearing on the shaft hub teeth and is composed of two sections bolted together when in use but which may be detached from one another which will permit application to or be removed from the shaft hubs.

The rocking bearing between the hubs and sleeve permits the shafts to assume positions in which they are misalined and the primary object of the present invention is to provide a coupling of this character with means for preventing longitudinal movement of the two shafts with respect to each other while still permitting the shafts to be somewhat misalined while in operation. More specifically, the present invention contemplates a flexible coupling especially adapted for use on propeller drives where it is necessary, in transmitting the power from the engine to the propeller, that the coupling compensate for shaft misalinement without straining the shafts or bearings and where it is also necessary to transmit the end thrust from the propeller into either direction without end play of the shafts.

With these and other objects in view the invention consists in certain novel details of construction and combinations and arrangements of parts, all as will hereinafter be more fully described and the novel features thereof particularly pointed out in the appended claims.

In the accompanying drawings,—

Fig. 2 is a similar view showing a flexible coupling wherein angular misalinement only is compensated for.

Figure 1:
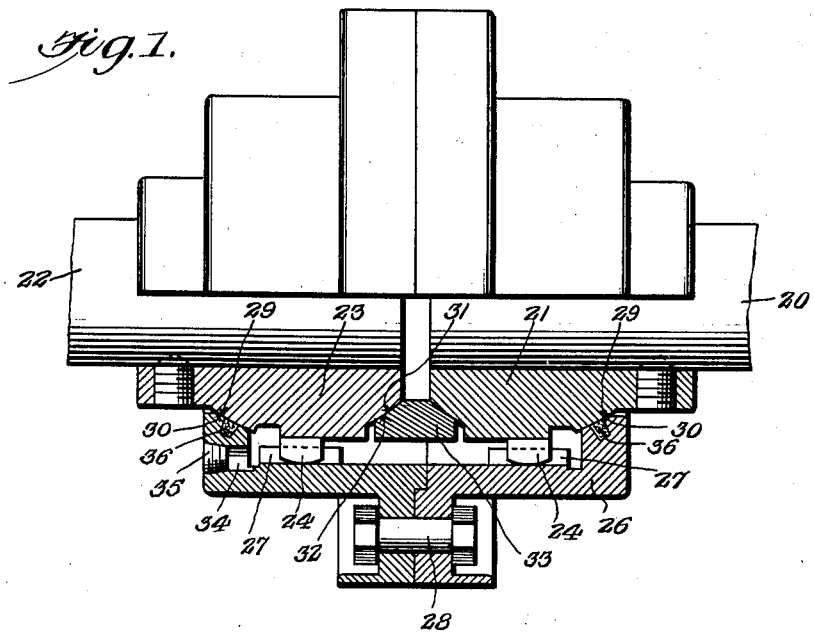
Figure 1 is a longitudinal sectional view of a coupling embodying the present invention wherein the shafts may be offset parallel or may be angularly misalined.

In the construction shown in Fig. 1 the driving shaft 20 has rigidly secured to its end portion a hub 21 and the propeller shaft or driven shaft 22 has a similar hub 23 mounted on its end. Each hub has formed thereon an annular series of teeth 24 whose crowns are curved so as to take a rocking bearing on a sleeve 26 between elongated teeth 27 of said sleeve. As before stated, sleeve 26 is preferably made in two sections so as to facilitate its application to or removal from the shaft sections, the two sections being firmly secured together when in use by bolts 28.

Due to the rocking bearings between teeth 24 and the sleeve 26 it will be apparent that compensation is provided for either angular misalinement of the shafts or for offset parallel shaft misalinement. In addition to this, however, in flexible couplings of the marine type designed for transmitting motion from a source of power to a propeller it is also necessary to provide means which will transmit end thrust from one shaft to the other without end play. In the present instance this is taken care of by having cooperating means on the sleeve and each hub for preventing longitudinal movement of the shafts away from each other while the two hubs themselves have means thereon for preventing longitudinal movement of the shafts toward each other.

In a coupling of this type shown in Fig. 1 wherein offset parallel shaft misalinement, as well as angular shaft misalinement is compensated for, these anti-thrust means preferably consist in having a spherical surface 29 formed on each hub adapted to engage similarly formed surfaces 30 on the sleeve for preventing longitudinal movement of the shafts away from each other, and for preventing movement of the shafts toward each other each hub is formed with a spherical surface 31 adapted to engage against similarly formed surfaces 32 on the ring 33 which is interposed between and carried by the juxtaposed ends of said hubs. With such a construction it is apparent that no end play of the shafts is possible when the propeller is being rotated or driven in either direction and, by the use of the spherical surfaces, misalinement of the shafts may be compensated for without the imposition of any undue strains on the coupling. As illustrated, the end plates of sleeve 26, on which the spherical surfaces are preferably formed, may be formed either integrally or separately from the sleeve sections proper. Lubricant may be injected into the interior of sleeve 26 through a lubricating orifice 34 which is closed by a suitable plug 35 and, to exclude water, dirt and other extraneous matter from the sleeve, so that the coupling will be oil, water and dust tight, felt packing 36 may be interposed between the hubs 21, 23 and the end plates of the sleeve.

Figure 2:
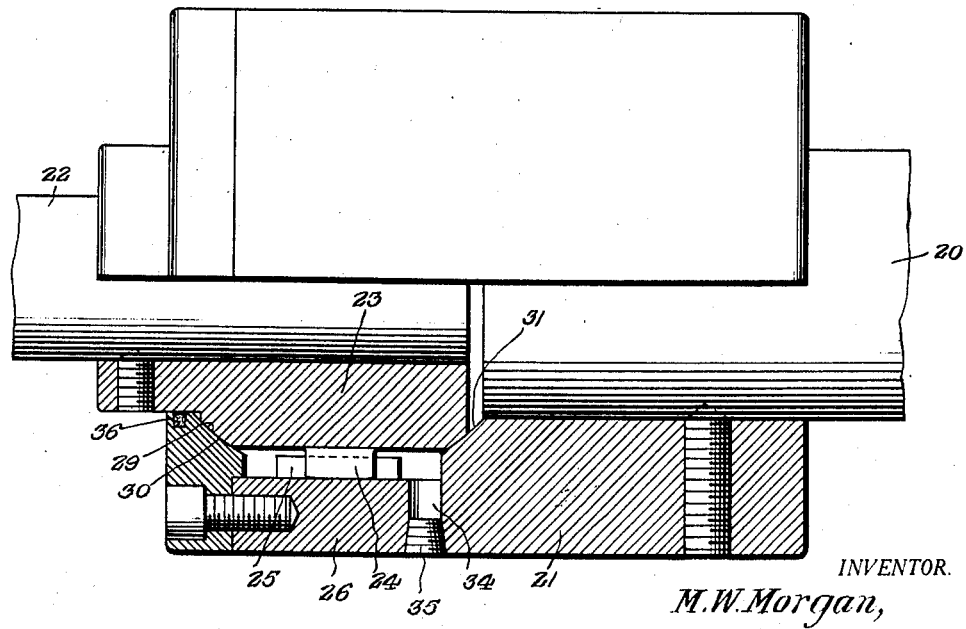

Referring to Fig. 2 wherein the shafts are capable of angular misalinement only, sleeve 26 is formed as an extension of hub 21 on the driving shaft 20, hub 23 on the propeller shaft 22 only being provided with teeth 24 which take a rocking bearing on said sleeve 26 between teeth 25 of the latter. In this construction means for preventing longitudinal movement of shafts toward each other are not only on the hubs, but, in fact, are formed integrally with said hubs, such means simply taking the form of complementary spherical surfaces 31 on abutting portions of the hubs. For preventing longitudinal movement of the propeller shaft away from the driving shaft the end plate of sleeve 26 is provided with a spherical surface 30 adapted to engage a similar surface 29 on hub 23 as in the previous construction. Suitable packing 36 is interposed between hub 23 and the end plate of sleeve 26 to make the coupling oil, water and dust proof while lubricant may be supplied to the interior of the sleeve through an orifice 34 which is closed by plug 35.

What I claim is:

1. In a flexible shaft coupling of the marine type, the combination of a pair of shafts, a hub on each shaft, a sleeve by which motion is transmitted from one shaft to the other, means spaced radially from the sleeve and supported on said hubs for preventing longitudinal movement of the shafts toward each other while permitting both angular and offset, parallel misalinement thereof, and cooperating means on said sleeve and one of said hubs for preventing longitudinal movement of said shafts away from each other while permitting misalinement thereof.

2. In a flexible shaft coupling of the marine type, the combination of a pair of shafts, a hub on each shaft, a sleeve by which motion is transmitted from one shaft to the other, one of said hubs having a rocking bearing in said sleeve, cooperating means on said sleeve and one of said hubs for preventing longitudinal movement of said hub away from the other hub, and means on the two hubs and spaced radially from said sleeve for preventing longitudinal movement thereof toward each other, said shafts being capable of being both angular and offset, parallel misalinement.

3. In a flexible coupling of the marine type, the combination of a pair of shafts, a hub on each shaft, a sleeve connecting said hubs to impart rotary motion from one shaft to the other, said sleeve having a rocking bearing on each of said hubs, cooperating means on said sleeve and each of said hubs to prevent longitudinal movement of the shafts away from each other, and means spaced radially inwardly from said sleeve for preventing longitudinal movement of said shafts toward each other, said shafts being capable of being both angular and offset, parallel misalinement.

4. In a flexible coupling of the marine type, the combination of a pair of shafts, a hub on each shaft, a sleeve connecting said hubs to impart rotary motion from one shaft to the other, said sleeve having a rocking bearing on each of said hubs, cooperating means on said sleeve and each of said hubs to prevent longitudinal movement of the shafts away from each other, a spherical surface on each hub, and a ring spaced radially inwardly from said sleeve and interposed between said hubs and having similar spherical surfaces engaging said hubs, whereby said shafts will be held against longitudinal movement toward each other while free to become misalined.

5. In a flexible coupling of the marine type, the combination of a pair of shafts, a hub on each shaft, a sleeve connecting said hubs to impart rotary motion from one shaft to the other, said sleeve having a rocking bearing on each of said hubs, a spherical surface on each hub, similar surfaces on said sleeve engaging the spherical surfaces of said hubs, a second spherical surface on each hub, and a ring spaced radially inwardly from said sleeve and interposed between and engaging the last mentioned spherical surfaces of said hubs.

MERTON W. MORGAN.